United States Patent

[11] 3,558,839

| [72] | Inventor | Willi Oppermann<br>Duisburg, Germany |
|---|---|---|
| [21] | Appl. No. | 718,462 |
| [22] | Filed | Apr. 3, 1968 |
| [45] | Patented | Jan. 26, 1971 |
| [73] | Assignee | Mannesmann Aktiengesellschaft<br>Duesseldorf, Germany<br>a corporation of Germany |
| [32] | Priority | Apr. 7, 1967 |
| [33] | | Germany |
| [31] | | M73497 |

[54] APPARATUS FOR CONTINUOUSLY WELDING THE LONGITUDINAL SEAM OF STEEL TUBES
2 Claims, 3 Drawing Figs.

[52] U.S. Cl............................................... 219/8.5, 219/59
[51] Int. Cl............................................... H05b 5/00, B23k 31/06
[50] Field of Search............................................ 219/8.5, 59, 67

[56] References Cited
UNITED STATES PATENTS

| 1,722,711 | 7/1929 | Sessions ........................ | 219/59 |
| 1,919,684 | 7/1933 | Caputo .......................... | 219/67X |
| 2,803,730 | 8/1957 | Kinghorn ....................... | 219/8.5 |

Primary Examiner—J. V. Truhe
Assistant Examiner—Hugh D. Jaeger
Attorney—Ernest F. Marmorek ABSTRACT: A method and apparatus for continuously welding the longitudinally seam of steel tubes, comprising a welding apparatus, and an arrangement for forming a split tube from steel strip and feeding the split tube to the welding apparatus, the arrangement comprising a stationary forming apparatus, and a movable shaping apparatus interposed between the welding apparatus and the stationary forming apparatus whereby the movable forming apparatus is moved close to the welding apparatus for starting the welding operation and is moved away from the welding apparatus and toward the stationary forming apparatus for the continuous welding operation.

PATENTED JAN 26 1971 3,558,839
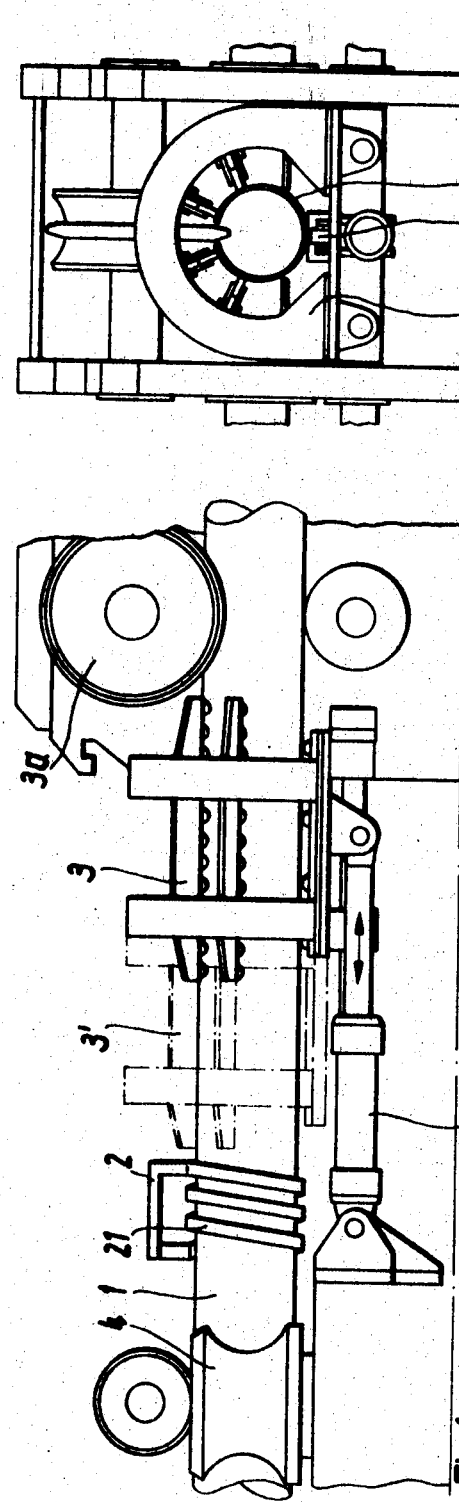
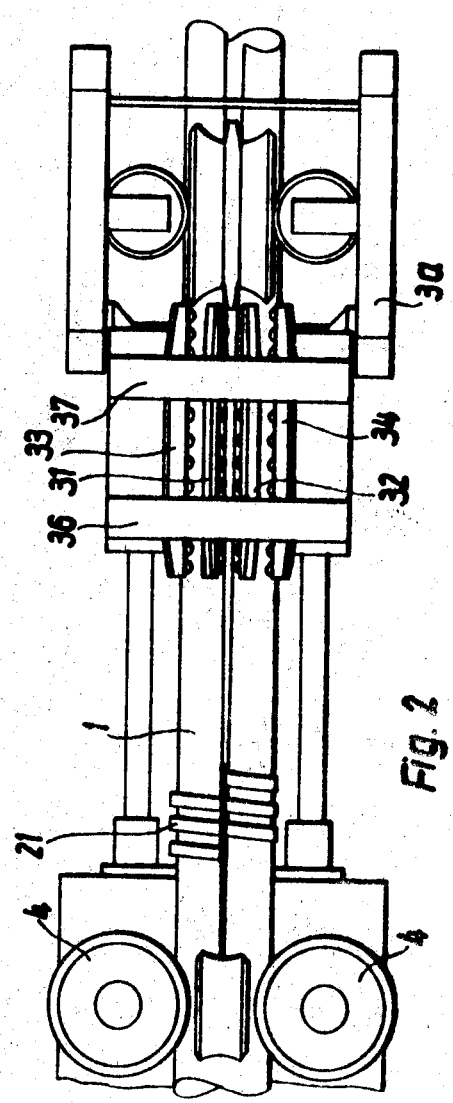
Inventor:
Willi Oppermann,
By *James A. Marmorek,*
His Attorney

APPARATUS FOR CONTINUOUSLY WELDING THE LONGITUDINAL SEAM OF STEEL TUBES

The invention relates to a method and apparatus for continuously welding the longitudinal seam of a split tube. The apparatus comprises a plurality of arrangements for gradually forming a split tube from a steel strip, a welding apparatus, and guide arrangements placed downstream of the welding apparatus.

When starting conventional arrangements the end of the strip which is already formed into a split tube travels unguided through a considerable distance after leaving the last forming apparatus until it runs into the first guide arrangement or into the nip of a pair of pressure rolls placed between the last forming apparatus and the first guide arrangement whereby only then the strip edges which must be welded are finally brought together so that welding may begin. The welding spot is thereby usually located at the elevation of the pressure roll pair and, at inductive or conductive high-frequency welding, at a considerable distance downstream of the last forming apparatus, because energy supply devices, for example an induction coil or contacts must be accommodated thereat. A forming apparatus placed adjacent the induction coil or the contacts usually heats up very much so that a certain distance from the current supply device forming part of the welding apparatus must also be provided.

It is an object of the present invention to provide a method and apparatus for continuously welding the longitudinal seam of a split tube whereby, when starting the apparatus, gaping of the split tube continuously formed from a strip is held within permissible limits.

In the apparatus according to the invention the last forming apparatus upstream of the welding apparatus is movable close to the welding apparatus.

With the apparatus according to the invention the strip edges which must be welded can be guided close to the welding apparatus when the apparatus is started and the last forming apparatus can be returned to operating position when the tube end has run into the guide arrangements or into a pressure roll pair placed upstream of the guide arrangements.

The invention is particularly useful in connection with inductive high-frequency welding whereby the last forming apparatus, in order to prevent overheating, must be relatively far away from the induction coil during continuous operation and remain adjacent the induction coil during starting for a short time only. With the arrangement according to the invention a considerable increase in output can be obtained because the strip edges, due to their elastic force, cannot gape so much as is the case in conventional arrangements, so that the winding diameter of the induction coil and the clearance between the coil and the tube can be reduced. A smaller clearance improves energy transmission and increases the output, which results in greater welding speed.

Of particular advantage is an embodiment of the invention wherein the movable forming or shaping apparatus has forming rolls supported by a common beam placed longitudinally of the split tube whereby the forming rolls of the forming roll beams which are on each side of the strip edges, which must be welded, and which rolls are closest to the welding apparatus, are placed forward of the frame carrying the roll beams.

By using roll beams which are known per se, in contradistinction to roll sets which act only in the respective frame plane and have large-profile rolls, the conventional advantages of guiding over numerous roll supports can be obtained and the roll supports can be moved close to the welding apparatus, for example an induction coil.

A further development of the invention wherein the movable forming apparatus is connected to the neighboring stationary forming apparatus by at least two common roll beams which act on both sides of the strip edges which must be welded whereby the roll beams are rigidly connected to the movable forming apparatus and are longitudinally movably connected to the stationary forming apparatus, prevents that the split tube is unguided for too long a distance between the movable forming apparatus and the first stationary forming apparatus which is upstream of the movable forming apparatus.

For starting the welding operation the movable forming or shaping apparatus is brought to starting position close to the welding apparatus and remains there until the end of the fully welded tube has run into the guide arrangement whereafter the movable shaping apparatus is moved backward to the operating position which is more distant from the welding apparatus.

Alternatively, for starting the welding operation, the movable shaping apparatus may not be moved toward the welding apparatus until the end of the split tube has run into the movable shaping apparatus whereby the advance velocity of the movable shaping apparatus should correspond to the running-in velocity of the split tube.

When finishing the welding operation the movable shaping apparatus together with the rear end of the tube may run toward the welding apparatus whereby resilient backing up of the split tube end is avoided and economy of the process is increased by accurately guiding and welding the rear end of the split tube, in contradistinction to operating without movement of the movable forming apparatus towards the weld point. When the welding apparatus is reached by the movable shaping apparatus, the welding current can be switched off by means of a switch which is locked when starting the welding operation.

With the apparatus according to the invention not only a single fine adjustment of the running-in angle, but also a continuous regulation of said angle is possible. The latter can be achieved by controlling movement of the movable forming apparatus during welding, for example, by a pulse given by a measuring apparatus continuously measuring the running-in angle of the strip edges which must be welded.

The controlled movement of the movable forming apparatus is limited because it is a fine control and is of particular importance when prior to the shaping of the strip to a split tube the end of a subsequent strip is welded to the trailing end of the first strip, so that transition to a subsequent strip coil is effected without interrupting the welding operation. The transverse weld seam of the strip running through the apparatus may cause a momentary slight change of the running-in angle whereby, particularly at electric resistance welding, the welding conditions are adversely affected.

The novel features which are considered characteristic of the invention are set forth with particularity in the appended claims. The invention itself, however, and additional objects and advantages thereof will best be understood from the following description of an embodiment thereof, when read in connection with the accompanying drawing, wherein:

FIG. 1 is a schematic elevation of an apparatus according to the invention for inductively welding the longitudinal seam of a steel tube;

FIG. 2 is a schematic plan view of the apparatus shown in FIG. 1; and

FIG. 3 is a schematic cross-sectional illustration of the apparatus shown in FIGS. 1 and 2.

Referring more particularly to the three figures of the drawing wherein like elements are designated by like numerals, numeral 1 designates a tube to be welded, and numeral 2 designates a welding apparatus whose induction coil 21 surrounds the tube 1. A plurality of forming and transporting structures 3 and 3a are placed ahead of the coil 21. Behind the coil 21 a pair of pressure rolls 4 of a guiding structure is placed. Additional tube guiding structures may be provided which guide the tube until the weld seam is sufficiently cooled.

The structure 3 can be moved longitudinally of the tube 1 close to the induction coil 21 which position is shown by dash-dot lines in FIG. 1. The structure 3 comprises a frame having two parts 36 and 37 supporting a plurality of roller beams 31, 32, 33, 34. Counterrolls 35 are placed opposite said roller beams. The structure 3 can be moved longitudinally of the tube 1 by means of a hydraulic cylinder 5.

I wish it to be understood that I do not desire to be limited to the exact details of construction shown and described, or to the steps of the method, for obvious modifications will occur to a person skilled in the art.

I claim:

1. An apparatus for continuously welding the longitudinal seam of a tube made from steel strip, comprising a plurality of forming apparatuses arranged in series relation with respect to the movement of the steel strip for gradually shaping the steel strip to form a split tube, a welding apparatus receiving the split tube from that one of said forming apparatuses which is passed last by the formed split tube, and a guide arrangement receiving the finished welded tube from said welding apparatus, said forming apparatus passed last by the formed split tube being movable longitudinally of the tube to a position adjacent said welding apparatus, said movable forming apparatus comprises a plurality of beams placed longitudinally of the split tube, a plurality of forming rolls supported by each of said beams, a frame supporting said beams, at least the form rolls arranged adjacent the longitudinal edges of the split tube and nearest the welding apparatus being placed forward of said frame.

2. An apparatus for continuously welding the longitudinal seam of a tube made from steel strip, comprising a plurality of forming apparatuses arranged in series relation with respect to the movement of the steel strip for gradually shaping the steel strip to form a split tube, a welding apparatus receiving the split tube from that one of said forming apparatuses which is passed last by the formed split tube, and a guide arrangement receiving the finished welded tube from said welding apparatus, said forming apparatus passed last by the formed split tube being movable longitudinally of the tube to a position adjacent said welding apparatus, said movable forming apparatus comprises a plurality of beams placed longitudinally of the split tube, a plurality of forming rolls supported by each of said beams, a frame supporting said beams, at least the form rolls arranged adjacent the longitudinal edges of the split tube and nearest the welding apparatus being placed forward of said frame, the forming apparatus receiving the steel strip and discharging the formed split tube into said movable forming apparatus is stationary and is connected to said movable forming apparatus by at least two of said beams, the latter being rigidly connected to said movable forming apparatus and being movably connected to said stationary forming apparatus for movement longitudinally of the split tube.